United States Patent
Bi et al.

(10) Patent No.: US 7,596,089 B2
(45) Date of Patent: Sep. 29, 2009

(54) SCHEDULER METHOD AND APPARATUS FOR COMMUNICATION SYSTEMS

(75) Inventors: Qi Bi, Morris Plains, NJ (US); Ching Yao Huang, Randolph, NJ (US); Pi-Chun Chen, Lake Hiawatha, NJ (US); Patrick Li, Mendham, NJ (US); Stanley Vitebsky, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1096 days.

(21) Appl. No.: 10/160,125

(22) Filed: Jun. 4, 2002

(65) Prior Publication Data

US 2003/0223451 A1 Dec. 4, 2003

(51) Int. Cl.
*G01R 31/08* (2006.01)

(52) U.S. Cl. .............. 370/232; 370/235; 370/395.4; 455/452.1; 455/452.2; 455/453

(58) Field of Classification Search .......... 370/232, 370/235, 395.4; 455/452.1, 452.2, 453
See application file for complete search history.

(56) References Cited

U.S. PATENT DOCUMENTS

| | | | |
|---|---|---|---|
| 5,485,147 A | 1/1996 | Jaffe et al. | |
| 6,104,700 A * | 8/2000 | Haddock et al. | 370/235 |
| 6,393,012 B1 * | 5/2002 | Pankaj | 370/342 |
| 6,535,523 B1 * | 3/2003 | Karmi et al. | 370/468 |
| 6,728,270 B1 * | 4/2004 | Meggers et al. | 370/514 |
| 6,788,687 B2 * | 9/2004 | Bao et al. | 370/394 |
| 6,917,812 B2 * | 7/2005 | Damnjanovic | 455/452.2 |
| 7,095,759 B1 * | 8/2006 | Fitzgerald | 370/538 |

OTHER PUBLICATIONS

Jong Hun Rhee et al.: "A Wireless Fair Scheduling Algorithm for 1xEV-DO Syetem," VTC Fall 2001. IEEE 54th Vehicular Technology Conference. Proceedings. Atlantic City, NJ, Oct. 7-11, 2001, IEEE Vehicular Technology Conference, New York, NY: IEEE, US, vol. 1 of 4. Conf. 54, Oct. 7, 2001 (Oct. 7, 2001), pp. 743-746, XP010562527.

Kuenyoung Kim et al.: "A Proportionally Fair Scheduling Alogorithm with QoS and Priority in 1xEV-DO," School of Communication Engineering, vol. 5, 15 Sep. 2002 (Sep. 15, 2002), pp. 2239-2243, XP010614126.

European Search Report dated Oct. 8, 2003 EP 0325 3194.

* cited by examiner

*Primary Examiner*—Kevin C Harper
*Assistant Examiner*—Sai-Ming Chan

(57) ABSTRACT

In the method, an average user throughout over all active users is computed, and each user's user perceived throughput is compared against the computed average throughout. Based on the comparison, the scheduling of the plurality of users is prioritized. In an embodiment, a priority adjustment factor is applied to each user to prioritize the scheduling of users to receive a data transmission. The priority adjustment factor is determined based in part on an update function. The update function is proportional to a calculated difference between each user's user perceived throughput and the average user throughput. Based on the sign of the update function, the priority adjustment factor is either incremented or decremented, and hence, prioritization of users is ordered. The output of the scheduler is user identifying information that informs the base station to transmit data in a current time slot to the identified user determined as the highest priority user by the scheduling method.

7 Claims, 3 Drawing Sheets

SCHEDULER METHOD AND APPARATUS FOR COMMUNICATION SYSTEMS

BACKGROUND OF THE INVENTION

1. Field of the Invention

The present invention relates generally to next generation wireless communication systems; and more particularly, to a scheduler method and apparatus used in these systems.

2. Description of Related Art

New technical challenges emerge as telecommunication systems evolve from a second generation system offering pure voice services, to a third generation system providing mixed voice and data services. In meeting data service demands, new performance metrics and algorithms need to be defined in order to optimize data performance.

CDMA 3G-1x Evolution Data Only (1xEVDO or known as High Data Rate) system is an evolution system of cdma2000 3G-1x system, and is a pure data system to provide data services to mobile users. In 1xEVDO, a scheduler or scheduling function is provided in a base station controller in order to provide fast scheduling or management of system resources based on channel quality feedback from one or more mobiles. In general, a scheduler selects a mobile for transmission at a given time instant, and adaptive modulation and coding allows selection of the appropriate transport format (modulation and coding) for the current channel conditions seen by the mobile.

In second generation wireless communications systems such as those of the IS-95 standard, applications typically employ voice-based communication schemes, in which a connection between the base station and the mobile is a dedicated connection. Since these are essentially fixed connections, there is no need for prioritizing the order of transmission to the active users served by the system (an active user is a user with data to transmit at a current time instant). However, with the emergence of third generation wireless data communications systems, such as CDMA-2000 standard systems and 1xEVDO, management of system resources is paramount. This is because properties of data differ significantly from properties of voice. For example, a data transmission, unlike a voice transmission, is not necessarily continuous and may be embodied as a burst transmission or an intermittent-type transmission between a base station and a mobile, for example. Accordingly, a base station in a third-generation system will attempt to manage a large pool of data users by assigning radio resources to each user for transmission. Typically this is done utilizing a prioritization scheme controlled by a scheduler in the base station controller. In a conventional prioritization scheme, idle mobile's are assigned a lower priority than mobile with data to transmit.

Accordingly, the scheduler must be able to manage these large numbers of users without wasting radio resources of the communication system. This management function becomes even more important as a base station attempts to meet QoS (Quality of Service) requirements. QoS is a general term that may represent a number of different requirements. As a basic tenant, QoS is indicative of providing guaranteed performance (e.g., such as a minimum/maximum data network throughput, a minimum delay requirement, a packet loss rate, and a packet download time, etc.) in a wireless communications system.

Presently, several scheduler algorithms have been proposed. One algorithm is termed a proportional fair (PF) scheduler algorithm. The principal of the PF algorithm is to schedule users for transmission with a maximum data rate channel (DRC) requested-to-average throughput ratio, which is also referred to as the priority weight of each user. In telecommunications, throughput means bits of information received per second. A user perceived throughput in the system is defined as the average information bits received by a user per second. In mathematical form, this ratio may be expressed by the following expression:

$$\max_i \frac{DRC_i(n)}{R_i(n)}, \quad (1)$$

$$\text{where } R_i(n) = \left(1 - \frac{1}{T}\right) R_i(n-1) + \frac{1}{T} DRC_i^{assigned}(n).$$

In expression (1), $DRC_i(n)$ is the DRC value requested by user i at time instant n. $DRC_i^{assigned}$ is the DRC value assigned to user i at time instant n. $R_i(n)$ is the i-th user throughput averaged by an IIR filter with time constant T. The time constant T is a time scale over which the average throughput is measured. The fairness principal is also based on time constant T. The choice of T should be sufficiently large to smooth out fluctuations of fading channels, and to represent an average channel condition perceived by a user, but not too large to meet or exceed packet delay requirements.

The PF algorithm explores a multiplexing gain from multiple users, and at the same time serves users in what is called a "proportional fair" sense. The PF algorithm tends to equalize the $DRC_i(n)/R_i(n)$ ratio among users. As a result, the average user throughput will be "proportional to" the DRC rate a user has requested, or $R_i \propto DRC_i$. In other words, a user having a good channel condition will achieve a good throughput, and for a user with poor channel condition, a poor throughput. Moreover, the PF algorithm is a generic algorithm which does not take care of QoS requirements that may be imposed by the system. Additionally, the PF algorithm requires much guess work and is not fully implemented for user diversity.

Another algorithm, called a generalized proportional fairness algorithm or G-Fair algorithm, is a generalized version of the PF algorithm that has been created to further explore user diversity. The algorithm may be defined by the following expression;

$$\max_i \frac{DRC_i(n)}{R_i(n)} * \frac{h(DRC_i^{avg})}{DRC_i^{avg}} \quad (2)$$

where $DRC_i(n)$, $DRC_i^{assigned}(n)$, and $R_i(n)$ have the same definitions as stated in Equation (1); and where $DRC_i^{avg}(n)$ is the averaged DRC value of user i at time instant n, and is updated using the following expression:

$$DRC_i^{avg}(n) = \left(1 - \frac{1}{T}\right) DRC_i^{avg}(n-1) + \frac{1}{T} DRC_i^{assigned}(n). \quad (3)$$

The priority weight computation in the G-Fair algorithm differs from the PF algorithm by multiplying the original weighting value with a function $h(DRC_1^{avg})/DRC_1^{avg}$. There are five different variations of function h( ) which lead to five different options for G-Fair algorithms:

Option 0: $h(DRC_i^{avg}) = DRC_i^{avg}$;
Option 1: $h(DRC_i^{avg}) = 2*DRC_i^{avg}$;
Option 2: $h(DRC_i^{avg}) = 4*DRC_i^{avg}$;
Option 3: $h(DRC_i^{avg}) = 1$;
Option 4: $h(DRC_i^{avg}) = \min(c*DRC_i^{avg}, d)$.

In Options 0-4, $DRC_i^{avg}$ is the average DRC value in units of 150 bps of the i-th user, c is a constant, and d is a constant with a valid range between 256-16384. ,The constant c maybe set to 1 to simplify the above expression (3). Option 0, Option 1 and Option 2, though each in a different form, all lead to a PF algorithm in terms of their performance because all users' priorities are scaled by the same fixed constant and the order of priorities remain unchanged. In Option 3, where h( )=1, the constant "1" on the right hand side of the expression may be replaced by other constants without affecting the performance of Option 3. The scheduling principle in Option 3 is different from the scheduling principles of the PF algorithm. Instead of providing a user throughput that is proportional to a user's requests, as suggested by the PF algorithm, Option 3 provides a user throughput that is proportional to the variation of a user's requests over time.

Option 4 is a generalized form of the G-Fair algorithm. Option 4 will degenerate into Option 3 with a small d value, and become Options 0, 1, and 2 with a large d value. The performance of Option 4 is dictated by the ratio of the two parameters, constant c and constant d, but not their absolute values. For instance, in comparing a situation where {c=1, d=256} and a situation where {c=2, d=512} each result in the same performance. To further simplify the expression (3), the parameter c is normalized to equal one (c=1). Since Option 4 encompasses other options of the G-Fair algorithm, the following discussion focuses primarily on Option 4 of the G-Fair algorithm.

FIG. 1 illustrates performance of a conventional scheduler algorithm. Specifically, the h-function of Option 4 of the G-Fair algorithm consists of two fragments of straight lines, as illustrated in FIG. 1. For $DRC_i^{avg}$ values less than d, the weight computation in equation (2) reduces to equation (1) of PF algorithm. For $DRC_i^{avg}$ values greater than d, $H(DRC_i^{avg})$ values is capped at d, and the weight computed in equation (2) will be a smaller value than as computed in PF algorithm. This behavior of h-function provides a control mechanism to discourage users with high $DRC_i^{avg}$, so as to benefit a user having a poor $DRC_i^{avg}$. With a properly chosen d value, the dynamic ranges of user perceived throughputs, the distance range between the minimum and the maximum throughputs, can be adjusted as well.

The performance of the G-Fair algorithm was simulated based on the assumptions listed in Table 1. For the stimulation, 20 simultaneous active mobiles at 3 kmph with full buffer data to transmit where evaluated. Three propagation channel conditions were simulated, including additive white gaussian noise (AWGN), 1-path Rayleigh fading and 2-path Rayleigh fading. The values of parameter d in the h-function were chosen as multiples of 256, such that the corresponding physical channel rates were multiples of 38.4 kbps.

TABLE 1

G-Fair Algorithm Simulation Assumptions.

| | |
|---|---|
| Number of mobiles | 20 |
| mobile Speed | 3 kmph |
| Propagation Channels | AWGN, 1-path, 2-path |
| Traffic Model | Full Buffer Transmission |
| IIR Filter Time Const T | 1024 |
| h-function | 256 (38.4 kbps), |
| Parameter d | 512 (76.8 kbps), |
| | 1024 (153.6 kbps), |
| | 2048 (307.2 kbps), |
| | 4096 (614.4 kbps), |
| | 8192 (1.2 Mbps), |
| | 16384 (2.4 Mbps) |

FIG. 2 illustrates the performance of the conventional scheduler algorithm of FIG. 1 for different user throughputs. Specifically, FIG. 2 illustrates the performance of the G-Fair algorithm in terms of user throughputs and sector throughputs. A user throughput characterizes the user-perceived channel rate, and is embodied as a ratio of the total successfully received bits by a user on a physical to the session active time. The sector throughput is the aggregate channel rate per sector. A coverage area served by one BS is called a cell; within a cell, there might be multiple sectors. The typical configuration is to have three sectors in one cell. The sector throughput is computed as the ratio of the total good physical channel transmitted bits to the simulation time.

A standard deviation of user throughput can be considered a measure of "fairness". As shown in FIG. 2, as the value of parameter d varies between 256 to 16384, the standard deviation of user throughput ranges from about 0 to 45 kbps, and the sector throughput ranges from about 400 to 1000 kbps. The standard deviation of the user throughout decreases as the value of parameter d decreases. A small value of d can be used to provide uniform user throughput independent of different channel conditions of individual users. However, the tradeoff to reducing d results in a reduced sector throughput, because the scheduler does not fully explore good channel conditions seen by some users. The scheduler treats all users as if they had the same channel conditions. However, by properly choosing parameter d, a certain degree of fairness may be achieved, albeit with a compromised sector throughput.

The G-Fair algorithm, much as the PF algorithm, is a generic algorithm which would require extensive modification as more requirements are imposed on the wireless system, such as the aforementioned QoS requirements. For instance, in order to impose minimum or maximum rate QoS requirements, the scheduler needs to define an objective variable that is a function of QoS variables. There is no mechanism in presently proposed scheduler algorithm(s) that enable the scheduler to handle the increasing QoS requirements of third generation wireless systems.

SUMMARY OF THE INVENTION

There is described a scheduler and a method of scheduling a plurality of users to receive transmitted data that addresses the aforementioned problems. In the method, an average user throughout for all active users in the system is computed, and each user's actual throughput is compared against the computed average throughout. Based on the comparison, the scheduling of the plurality of users (e.g, scheduling order in which users receive data transmissions) is prioritized.

In an embodiment, a priority adjustment factor, to be applied to each user, is determined to prioritize the scheduling of the plurality of users. The priority adjustment factor is determined based in part on an update function. The update function is proportional to a calculated difference between a user's actual throughput and the computed average user throughput for all active users. Based on the sign for the update function, each of the plurality of users are prioritized by the scheduler. The priority adjustment factor is either incremented or decremented based on the sign of the update function. The scheduler outputs priority information that informs the base station to transmit data in a current time slot to the user determined as the highest priority user.

DETAILED DESCRIPTION

Although the principles of the invention are particularly well-suited for wireless communications systems based on the well-known High Speed Downlink Packet Access (HSDPA) specification in the Universal Mobile Telecommunication System (UMTS) standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein. Additionally where used below, user and user equipment (UE) is synonymous to a mobile station in a wireless network, and base station and Node-B may be used interchangeably.

Figure 1:
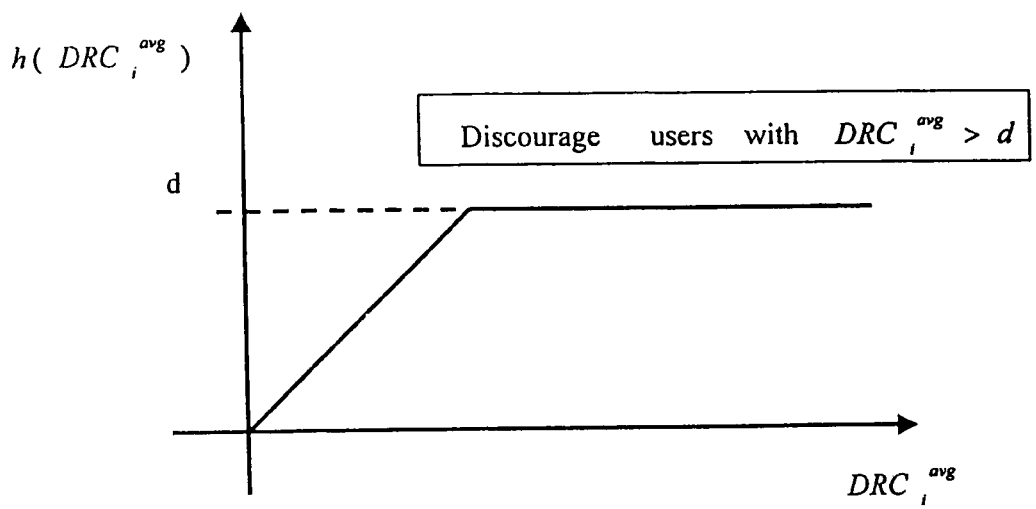
FIG. 1 illustrates performance of a prior art scheduler algorithm.
Figure 2:
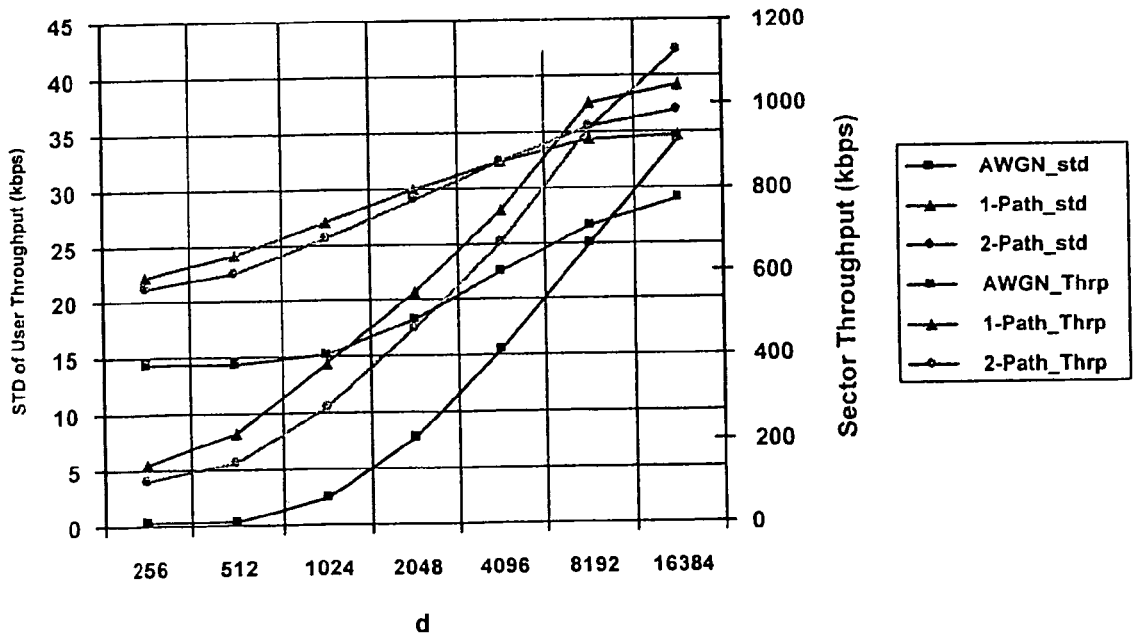
FIG. 2 illustrates performance of the prior art scheduler algorithm of FIG. 1 for different user throughputs.
Figure 3:
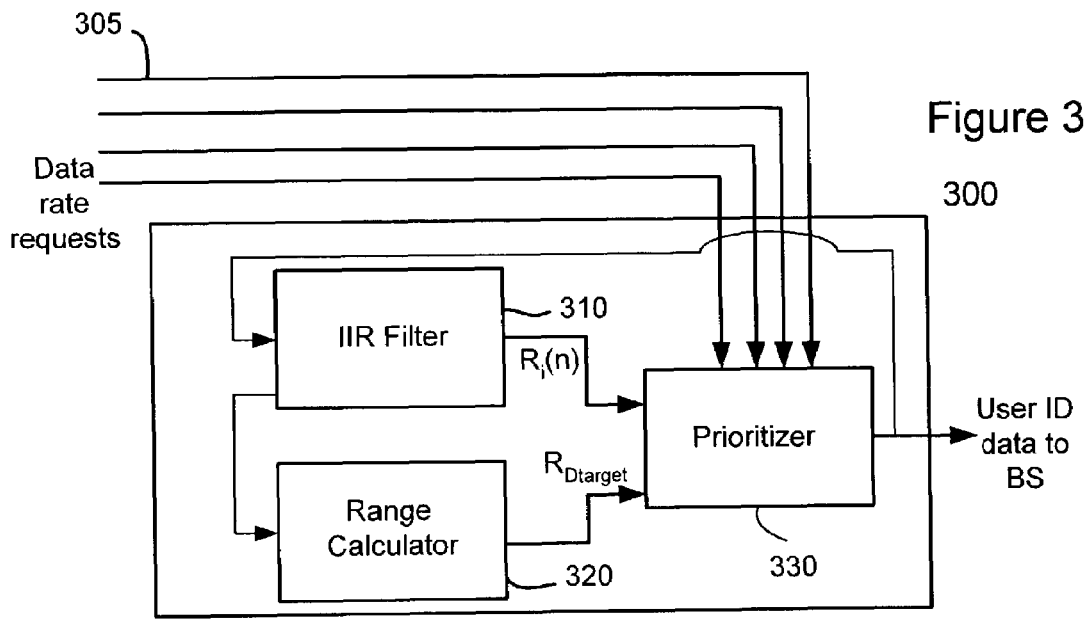
FIG. 3 illustrates a block diagram of a scheduler in accordance with the invention.

FIG. 3 illustrates a block diagram of a scheduler in accordance with the invention. As illustrated in FIG. 3, a base station controller (not shown) includes a scheduler 300. As inputs to the scheduler 300, a plurality of active users send data rate requests over data rate channels (DRC's) 305. The values transmitted by a user over a DRC 305 are indicative of the requested rate of that user. The plurality of requested data rates are received by an IIR (Infinite Impulse Response) filter 310, which assimilates the requested data rates over all active users and computes an average user throughput for all active users.

Additionally, each data rate request is input to a range calculator 320. The range calculator 320 calculates an average user throughput, which is also referred to as the dynamic target rate $R_{Dtarget}$, based on user perceived throughputs updated by IIR filter 310. The average user throughput for all users and the maximum and minimum user throughput results are then forwarded to a prioritizer 330. As will be described in further detail below, prioritizer 330 performs a number of functions including, but not limited to, comparing the user perceived throughput of each user with the computed average user throughput, in order to determine priority of data transmission for scheduling each of the active users. As part of determining the priority for each user, the prioritizer 330 applies a priority adjustment factor that is based on an update function. The update function (the output of which are updates to the scheduling algorithm) is proportional to the calculated difference between a user's actual throughput and the average user throughput. Accordingly, prioritizer 330 assigns the priorities to each user based on the priority adjustment factor applied to each user, which is a function of the update function calculated for each user. The prioritizer 330 outputs priority information that informs the base station to transmit data in a current time slot to a user identified as the highest priority user.

Figure 4:
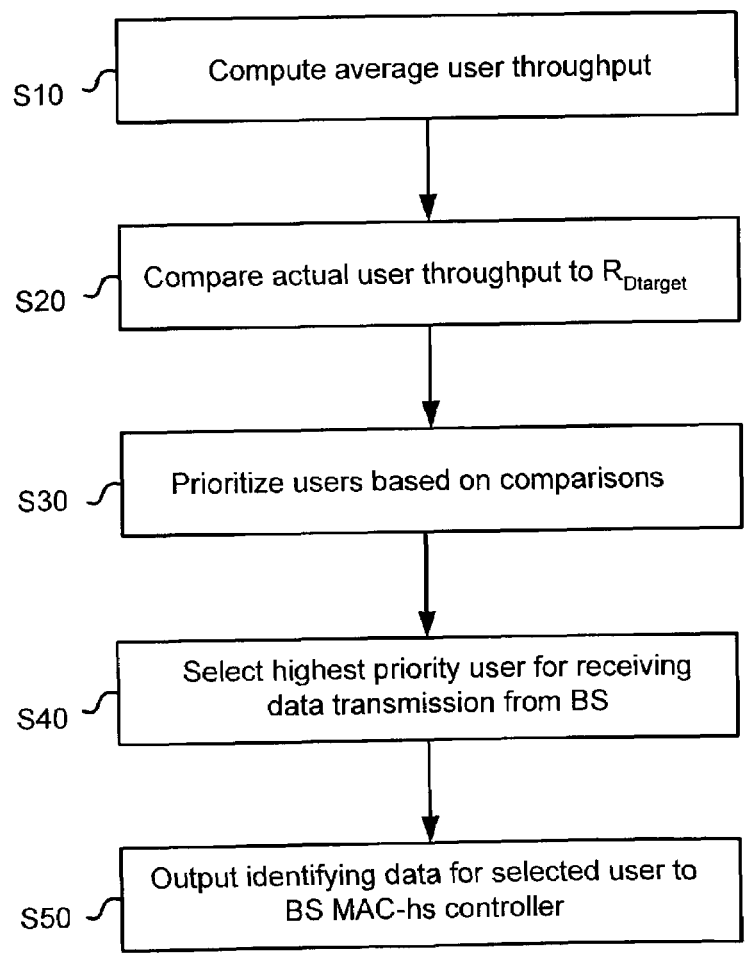
FIG. 4 illustrates a scheduling method in accordance with the invention.

FIG. 4 is a flow chart describing the method in accordance with the invention. Referring to FIG. 4, at every time instant, scheduler 300 computes an average user throughput over all active users (Step S10). Since the average user throughput changes over time, this quantity may be referred to as a dynamic target user throughput, or $R_{Dtarget}$. In Step S20, scheduling of the users is prioritized by comparing each the user perceived throughput of each user to the computed $R_{Dtarget}$. In particular, this comparison includes calculating a difference between each user's perceived throughput and the $R_{Dtarget}$.

More particularly, an update function, ($F_i^d(n)$) which is a function of the maximum user throughput, $R_{max}$, the minimum user throughput, $R_{min}$, and the average user throughput, $R_{Dtarget}$, at each time instant n, is determined. As will be illustrated by the expressions in further detail below, $F_i^d(n)$ is proportional to the difference between a user's user perceived throughput and $R_{Dtarget}$.

Based on the comparison in step S20, the scheduler 300 prioritizes (Step S30) the scheduling for all active users. As will be evident by the expressions discussed below, this prioritization is performed based on applying a priority adjustment factor, $F_i(n)$, to the scheduler algorithm to assign priority for each user. The priority adjustment factor is calculated based on the update function determined at each time instant for each user. Once each user has been prioritized, the highest priority user is selected by prioritizer 330 (Step S40), and prioritizer 330 outputs identifying information for that highest priority user (Step S50) which informs the base station to transmit data in the current time slot to that user.

Motivated by QoS requirements, the scheduler and scheduling method in accordance with the invention has been developed to provide fairness, as well as to place maximum and minimum constraints on user throughputs, while maintaining a sufficient sector throughput, the information bits per second received by users in a sector, [ for the wireless network or system. The scheduler algorithm is adapted so that all user perceived throughputs lie within an operating range between $R_{min}$ and $R_{max}$. Additionally, the scheduler algorithm introduces four additional parameters, $F_i(n)$, $F_i^d(n)$, $R_{max}$ and $R_{min}$, as have been briefly described above. Accordingly, the scheduler algorithm may be defined by the following expressions $$\max_i \frac{DRC_i(n)}{R_i(n)} * F_i(n) \qquad (4)$$

Where $F_i(n) = F_i(n-1) + \frac{F_i^d(n)}{M}$, and where $$F_i^d(n) = \begin{cases} -e^{(R_i(n)-R_{max})}, & R_{max} < R_i(n) \\ -(R_i(n)-R_{Dtarget}), & R_{Dtarget} < R_i(n) < R_{max} \\ -(R_i(n)-R_{Dtarget}), & R_{min} < R_i(n) < R_{Dtarget} \\ e^{(R_{min}-R_i(n))}, & R_i(n) < R_{min} \end{cases},$$

and where $R_{Dtarget}(n) = \frac{\sum_i R_i(n)}{N}$.

In expression 4, $DRC_i(n)$ and $R_i(n)$ are the same as defined in expression (1). $F_i(n)$ is a priority adjustment factor in weight computation of a user i, and is updated with an update function $F_i^d(n)$. $R_{max}$ and $R_{min}$ represent the maximum and minimum user throughputs, as described above, at each time instant n. M is a constant used for incrementing the priority adjustment factor; and N is the number of active users at a given time instant in the system.

Figure 5:
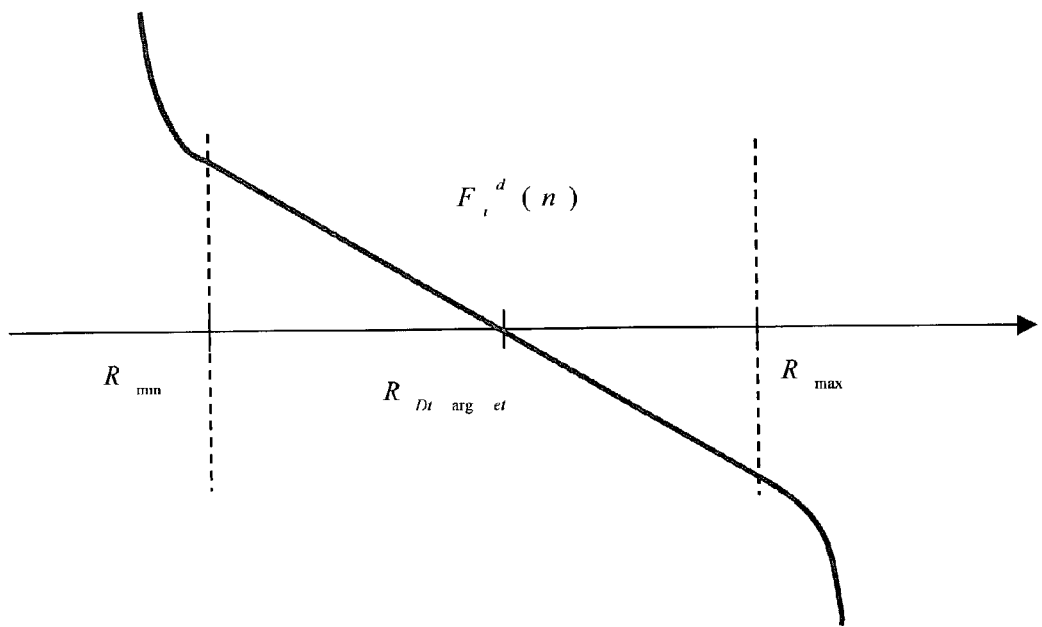
FIG. 5 illustrates behavior of the update function in accordance with the invention.

The behavior of the update function $F_i^d(n)$ is illustrated with respect to FIG. 5. Referring to FIG. 5, for a user whose user perceived throughput lies between $R_{min}$ and $R_{max}$, the update function is proportional to the difference between the user's perceived throughput and the average user throughput for all active users ($R_{Dtarget}$). Accordingly, the sign of the update function is positive for users whose user throughput is greater than $R_{Dtarget}$. The sign is negative for users whose throughput is less than $R_{Dtarget}$.

For active users whose user throughputs fall outside the operating range, the update function is an exponential function of the difference between user perceived throughput and either $R_{min}$ or $R_{max}$. Accordingly, as shown in FIG. 5 in this scenario the sign of the update function will be positive for users whose user perceived throughput are greater than $R_{max}$ and negative for users whose user perceived throughput are less than $R_{min}$. Utilizing these properties, the prioritizer 330 is able to increment or decrement the priority adjustment factor accordingly, and assign the higher priority to users whose user perceived throughput is less than $R_{min}$, and the lower priority to users whose user throughput is greater than $R_{max}$. The user with the highest priority will be the user with the maximum $DRC_i(n)/R_i(n)*F_i(n)$ as expressed in expression (4).

Figure 6:
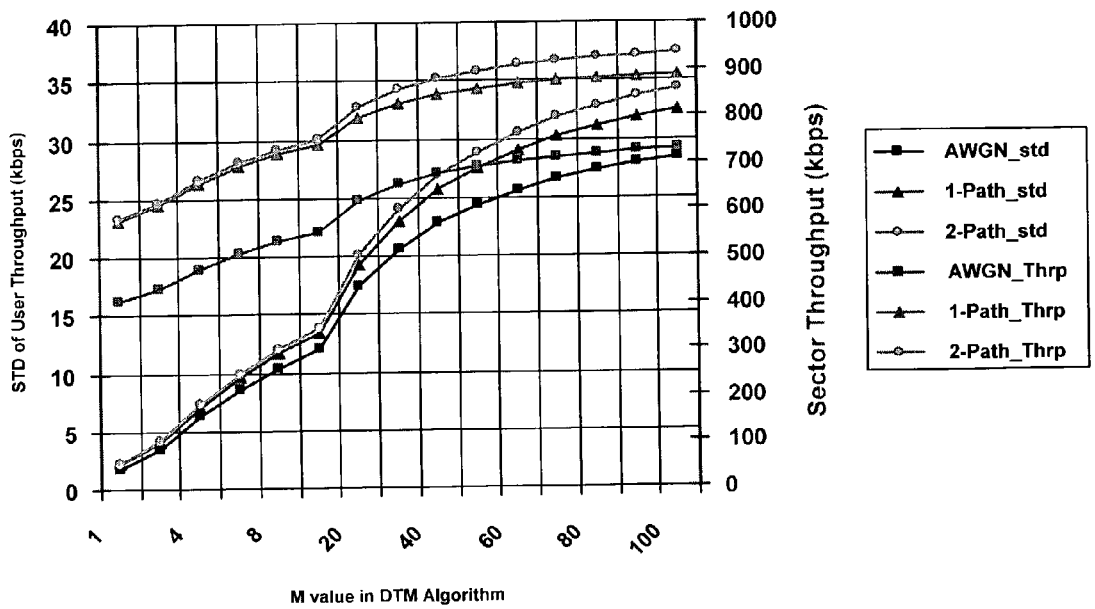
FIG. 6 illustrates performance of the scheduling method in accordance with the invention for different user throughputs.

FIG. 6 illustrates performance of the scheduling method in accordance with the invention for different user throughputs. To study the performance of the scheduler algorithm, simulations were conducted under the following assumption in Table 2.

TABLE 2

DTM Algorithm Simulation Assumptions.

| | |
|---|---|
| Number of mobiles | 20 |
| Mobile Speed | 3 kmph |
| Propagation Channels | AWGN, 1-path Rayleigh, 2-path Rayleigh |
| Traffic Model | Full Buffer Traffic Model |
| IIR Filter Time Const T | 1024 |
| Rmin | 9.6 kbps |
| Rmax | 1 Mbps |
| Initial Value of F(n) | 1000 |
| Const M in F(n) update | integers from 1 to 100 |

The simulation assumptions in Table 2 are similar to those described earlier with respect to the G-fair algorithm, with the exception that an operating range has been added with a lower end $R_{min}$ of 9.6 kbps and an upper end being set at $R_{max}$ of 1 Mbps. The initial value of the priority adjustment factor was set to 1000, and the constant M varies as a system parameter from 1 to 100. As illustrated in FIG. 6, sector throughput ranges from about 400 kbps to 1000 kbps, and the standard deviation of user throughput increases as constant M increases. In other words, smaller values of M will have a tighter control over the variations of user throughput as designed by the update values generated by the update function.

The proposed scheduler provides controls on the minimum and the maximum user perceived throughputs in order to meet certain delay requirements. In additional, it also provides tighter control on the variations user throughput, which can be explored to achieve user defined fairness not limiting to the proportional fairness of the existing algorithms.

The invention being thus described, it will be obvious that the same may be varied in many ways. For example, the logical blocks in FIGS. 3 and 4 may be implemented in hardware and/or software. The hardware/software implementations may include a combination of processor(s) and article(s) of manufacture. The article(s) of manufacture may further include storage media, computer-readable media having code portions thereon that are read by a processor to perform the method, and executable computer program(s). The executable computer program(s) may include the instructions to perform the described operations in the method. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

We claim:

1. A method of scheduling a plurality of active users to receive transmitted data in a wireless communications system, comprising:

computing, with a filter of the wireless communications system, an average user throughput over the plurality of active users, the average user throughput being a sum of data rate requests for all active user divided by the number of all active users;

comparing, with a prioritizer of the wireless communications system, an average information reception rate of the active user to at least one of the average user throughput, a maximum user throughput, and a minimum user throughput, the maximum user throughput being a greatest data rate request among the users, the minimum user throughput being a smallest data rate request among the users;

selecting, with the prioritizer, a function based on the comparison, the function relating an update function to at least one of the average information reception rate of the active user, the average user throughput, a maximum user throughput, and a minimum user throughput;

calculating, with the prioritizer, an update function value from the selected function; and prioritizing, with the prioritizer, the scheduling of the plurality of active users for receiving transmitted data based on the calculated update function value.

2. The method of claim 1, further comprising computing said average user throughput dynamically.

3. The method of claim 1, wherein the average information reception rate of the active user is configured so as to be within an operating range defined by a maximum user throughput, and a minimum user throughput.

4. A method of scheduling a plurality of active users to receive transmitted data in a wireless communications system, comprising:

computing, with a filter of the wireless communications system, an average user throughput over the plurality of active users, the average user throughput being a sum of data rate requests for all active user divided by the number of all active users;

comparing, with a prioritizer of the wireless communications system, an average information reception rate of the active user to at least one of the average user throughput, a maximum user throughput, and a minimum user throughput, the average information reception rate of the active user being configured so as to be within an operating range defined by the maximum user throughput and the minimum user throughput, the maximum user throughput being a greatest data rate request among the users, the minimum user throughput being a smallest data rate request among the users;

selecting, with the prioritizer, a function based on the comparison, the function relating an update function to at least one of the average information reception rate of the active user, the average user throughput, a maximum user throughput, and a minimum user throughput;

calculating, with the prioritizer, an update function value from the selected function; and prioritizing, with the prioritizer, the scheduling of the plurality of active users for receiving transmitted data based on the calculated update function value.

5. The method of claim 4, further comprising computing said average user throughput dynamically.

6. The method of claim 1, wherein the scheduling of the plurality of users is prioritized based on comparing a calculated update function value of a first active user to at least one calculated update function value of another active user.

7. The method of claim 4, wherein the scheduling of the plurality of users is prioritized based on comparing a calculated update function value of a first active user to at least one calculated update function value of another active user.

* * * * *

UNITED STATES PATENT AND TRADEMARK OFFICE
CERTIFICATE OF CORRECTION

| | | |
|---|---|---|
| PATENT NO. | : 7,596,089 B2 | Page 1 of 1 |
| APPLICATION NO. | : 10/160125 | |
| DATED | : September 29, 2009 | |
| INVENTOR(S) | : Bi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1536 days.

Signed and Sealed this

Twenty-eighth Day of September, 2010

David J. Kappos
*Director of the United States Patent and Trademark Office*